(12) United States Patent
Bolser et al.

(10) Patent No.: US 7,819,302 B2
(45) Date of Patent: Oct. 26, 2010

(54) ALUMINUM END CAPS ULTRASONICALLY WELDED TO END OF ALUMINUM TUBE

(75) Inventors: David R. Bolser, Florissant, MO (US); Karl F. Graff, Hilliard, OH (US); Timothy J. Trapp, Upper Arlington, OH (US)

(73) Assignee: The Boeing Company, Chicago, IL (US)

( * ) Notice: Subject to any disclaimer, the term of this patent is extended or adjusted under 35 U.S.C. 154(b) by 1040 days.

(21) Appl. No.: 10/955,134

(22) Filed: Sep. 30, 2004

(65) Prior Publication Data

US 2006/0071054 A1   Apr. 6, 2006

(51) Int. Cl.
*B23K 20/10* (2006.01)

(52) U.S. Cl. ............... 228/110.1; 228/1.1; 228/124.6; 156/73.1; 156/580.1

(58) Field of Classification Search ............ 228/110.1, 228/1.1; 156/73.1, 69, 580.1, 580.2, 308.4, 156/290, 73.3; 219/706
See application file for complete search history.

(56) References Cited

U.S. PATENT DOCUMENTS

| | | | | |
|---|---|---|---|---|
| 3,101,634 A | * | 8/1963 | Cooper | 228/1.1 |
| 3,257,721 A | * | 6/1966 | James | 228/1.1 |
| 3,426,951 A | * | 2/1969 | Pohlman et al. | 228/1.1 |
| 3,817,420 A | * | 6/1974 | Heisler | 220/790 |
| 3,920,503 A | * | 11/1975 | Keeler | 156/580.2 |
| 4,364,783 A | * | 12/1982 | Theodore et al. | 156/69 |
| 4,411,720 A | * | 10/1983 | Sager | 156/69 |
| 4,599,123 A | * | 7/1986 | Christensson | 156/69 |
| 4,631,685 A | * | 12/1986 | Peter | 700/212 |
| 4,640,733 A | * | 2/1987 | Bogren | 156/380.2 |
| 4,749,437 A | * | 6/1988 | Welter | 156/580.1 |
| 4,768,666 A | * | 9/1988 | Kessler | 215/232 |
| 5,375,525 A | * | 12/1994 | Greenslade et al. | 102/254 |
| 5,606,844 A | * | 3/1997 | Takagaki et al. | 53/410 |
| 5,642,606 A | * | 7/1997 | Ohlsson | 53/565 |
| 5,662,766 A | * | 9/1997 | Ishikawa et al. | 156/580.2 |
| 6,032,835 A | * | 3/2000 | Burt | 222/402.1 |
| 6,218,045 B1 | * | 4/2001 | Ide et al. | 429/176 |
| 6,324,987 B1 | * | 12/2001 | Wier | 102/530 |
| 6,802,920 B2 | * | 10/2004 | Shinohara et al. | 156/73.1 |
| 6,971,849 B2 | * | 12/2005 | Saito et al. | 415/215.1 |
| 7,134,190 B2 | * | 11/2006 | Bungo et al. | 29/753 |

FOREIGN PATENT DOCUMENTS

JP   10324304   * 12/1998

* cited by examiner

*Primary Examiner*—George Wyszomierski
*Assistant Examiner*—Michael Aboagye
(74) *Attorney, Agent, or Firm*—Ostrager Chong Flaherty & Broitman P.C.

(57) ABSTRACT

An aluminum tubular unit for long-term, leak-free storage of fluids is formed in which an aluminum cap is ultrasonically welded to an end of the aluminum tube. The ultrasonic weld is formed from a device capable of producing a torsional vibration pattern. The ultrasonic welding of the cap to the tube eliminates the use of seals and pins to seal the cap to the tube and further eliminates the need for having a hole in the cap to mechanically couple the respective end cap to the cylindrical tube. Furthermore, since ultrasonic welding does not generate significant heat, highly volatile and flammable fluids can be present within the tube when the caps are ultrasonically welded to the cylindrical body. In addition, one or more fins used may also be welded to the outside diameter of the cylindrical body using a related ultrasonic welding process.

12 Claims, 3 Drawing Sheets

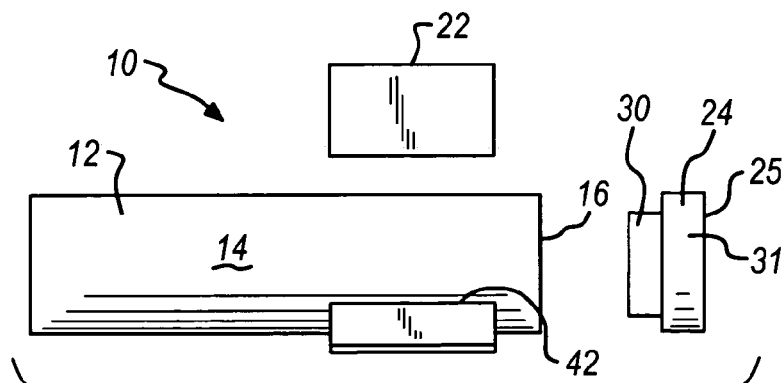
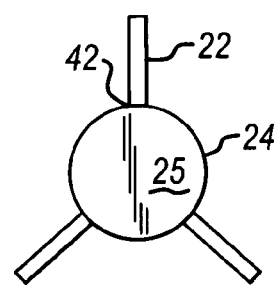
FIG. 1
FIG. 2
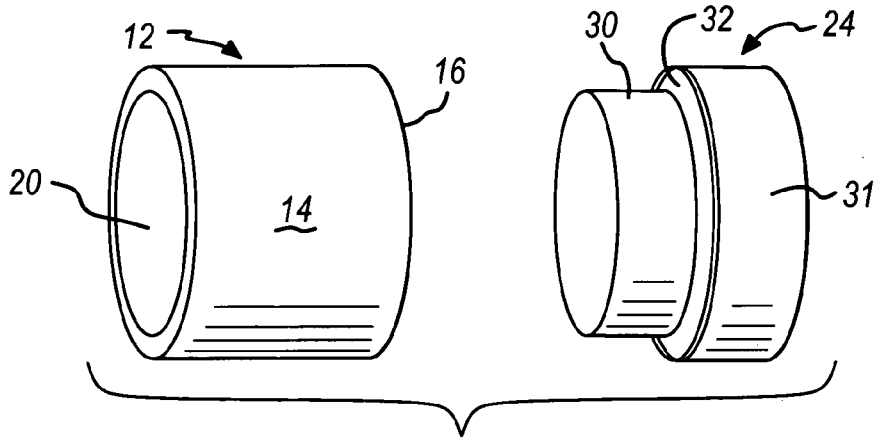
FIG. 3
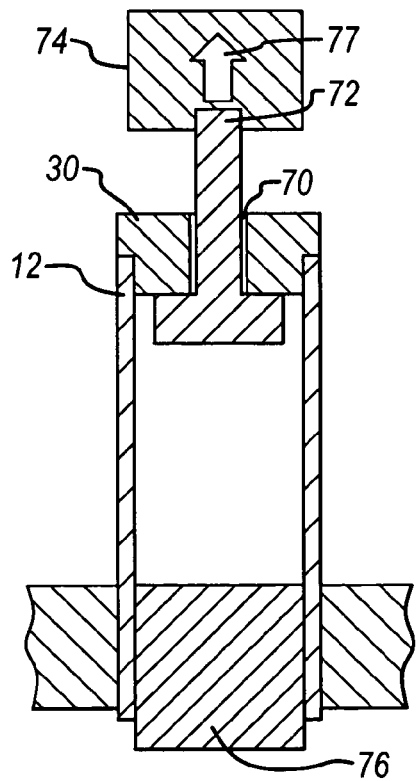
FIG. 5
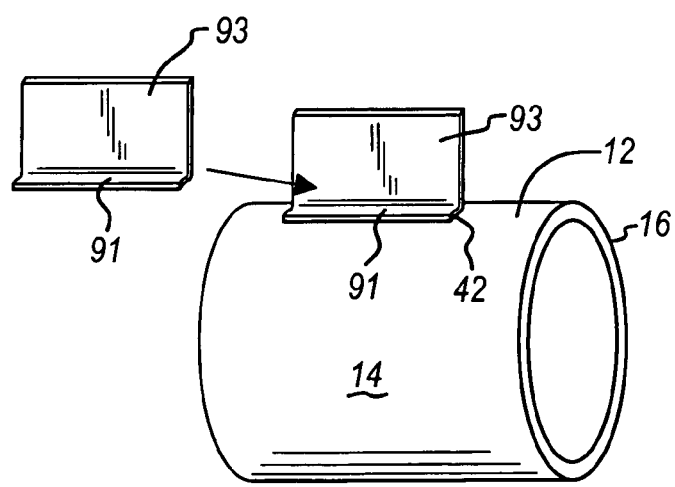
FIG. 8

ALUMINUM END CAPS ULTRASONICALLY WELDED TO END OF ALUMINUM TUBE

TECHNICAL FIELD

The present invention generally relates to aluminum tubular fluid storage units and more specifically aluminum end caps ultrasonically welded to aluminum tubes.

BACKGROUND ART

Aluminum tubular fluid storage units have been used in the aerospace industry in a wide variety of applications for storing and maintaining toxic fluids in a safe manner. For example, aluminum tubular fluid storage units are used as a component in a wide variety of conventional type warheads.

Typical prior art aluminum tubular units consist of an aluminum cylindrical body filled with the fluid and capped at one or both ends with a respective aluminum end cap. In order to properly seal the end cap to the cylindrical body, holes are drilled through a portion of the end cap and pins are inserted within the holes to mechanically couple the end cap to the cylindrical body: In addition, mechanical seals are introduced between a shoulder of the respective end cap and the end of the cylindrical body.

Prior art aluminum tubular units suffer from many problems associated with the design and manufacturing techniques. These pins and seals add to the overall complexity of the design and add significant costs to the manufacturing process. Further, these pins and seals are potential sources for leakage, especially when the tubes are stored over long time periods. This leads to potentially costly in-service repairs.

It is thus highly desirable to alter the design or the manufacturing techniques of aluminum tubular units to address these concerns.

SUMMARY OF THE INVENTION

The present invention solves the problem of prior art aluminum tubular fluid storage units by designing an aluminum cap that can be ultrasonically welded to the ends of the aluminum tube. The formed aluminum tubular unit allows one or both ends of the cylindrical tube to be sealed to prevent leakage and further provides a tube that will be leak free for multi-year storage. The ultrasonic welding of the cap to the tube eliminates the use of seals and pins to seal the cap to the tube and further eliminates the need for having a hole in the cap to mechanically couple the respective end cap to the cylindrical tube. Furthermore, since ultrasonic welding does not generate significant heat, highly volatile and flammable fluids (in a gaseous or liquid state) can be present when the caps are ultrasonically welded to the cylindrical body.

In addition, the present invention also discloses the parameters necessary for achieving the desired welding and further provides novel characteristics in terms of designing the ultrasonic welding sonotrode and in designing the weld fixtures.

In another related embodiment, each of the fins used in one type of tubular fluid storage unit may be ultrasonically welded to the outside diameter of the cylindrical body.

While the process is ideally used to join aluminum alloys parts, the present invention is suitable for use in joining any types of metal and is useful for a wide variety of potential applications.

Other features, benefits and advantages of the present invention will become apparent from the following description of the invention, when viewed in accordance with the attached drawings and appended claims.

BRIEF DESCRIPTION OF THE DRAWINGS

FIG. 1 is an exploded perspective side view of the components used to form an aluminum tubular fluid storage unit according to one preferred embodiment of the present invention;

FIG. 2 is an end view of FIG. 1;

FIG. 3 is a close-up perspective view of the end cap and cylindrical body of FIG. 1;

FIG. 5 is a sectional view of a testing apparatus used to measure the mechanical strength of the weld created in FIG. 1;

FIG. 8 is a perspective view of the process for forming a seam type ultrasonic weld of the fins to the tube of FIG. 1.

BEST MODES FOR CARRYING OUT THE INVENTION

Figure 4:
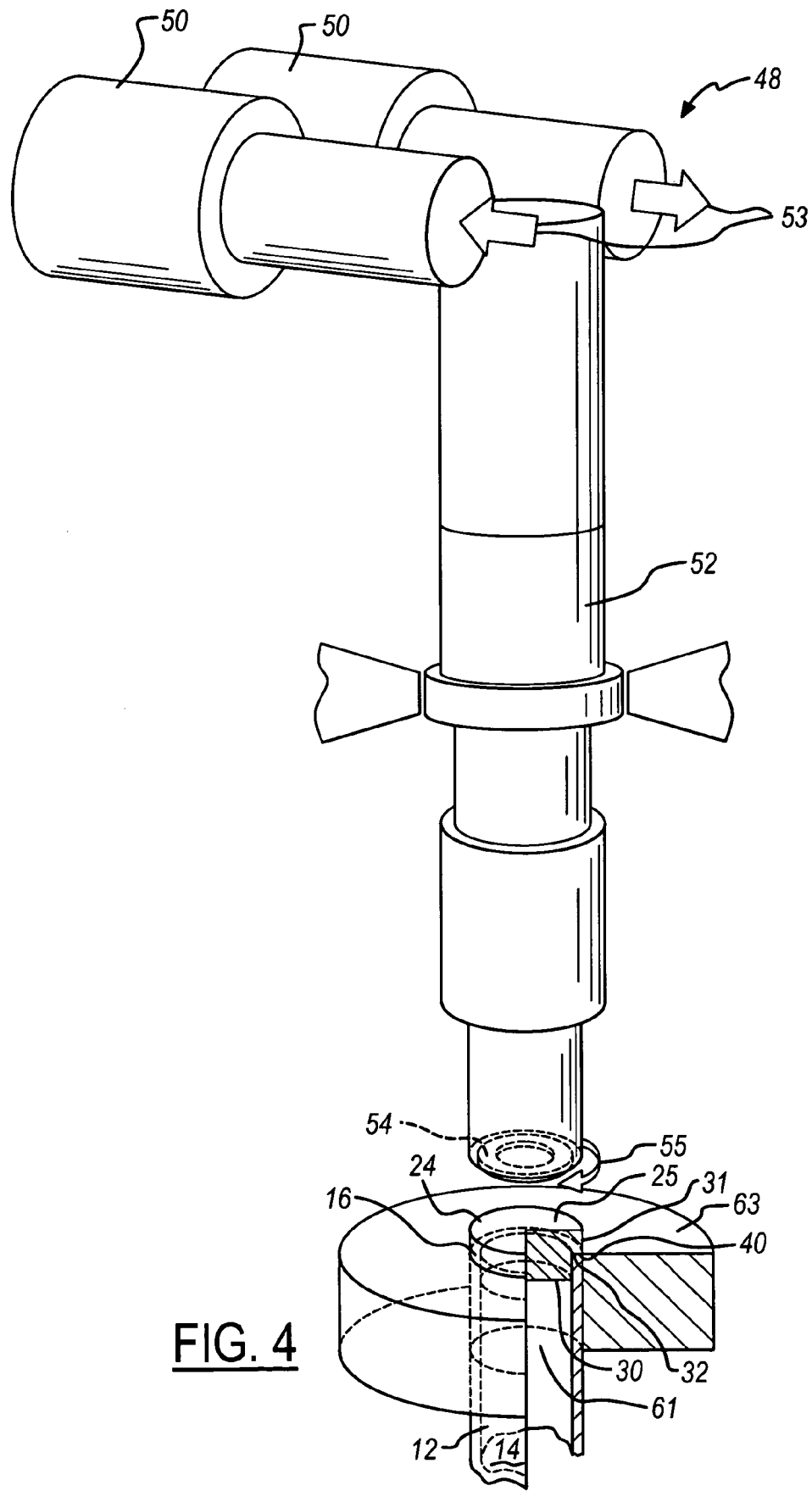
FIG. 4 illustrates a welding device according to a preferred embodiment of the present invention used to ultrasonically weld the end cap to the body as in FIGS. 1-3.

Referring now to FIGS. 1-3, an aluminum tubular fluid storage unit 10 is shown formed in accordance with a preferred embodiment that is used to store fluids, including toxic fluids, for extended periods of time. While the aluminum tubular unit 10 as shown herein is ideally suited for use as a leak free, toxic fluid storage unit, the principals of the present invention for coupling together various components may be utilized in any type of aluminum fluid storage unit.

As best shown in FIGS. 1 and 2, the aluminum tubular unit 10 consists of a hollow, cylindrical tube 12 and an end cap 24 sealingly coupled to the end 16 of the tube 12. A quantity of fluid (not shown) is introduced within the hollow central region 20 (shown in FIG. 3) prior to coupling the end cap 24 to the end 16 of the cylindrical tube 12. The fluid can be in a liquid or gaseous state. The other end (not shown) of the cylindrical tube 12 is also preferably end-capped in substantially the same manner. Alternatively, the cylindrical tube 12 could be formed with a solid, continuous bottom, thus eliminating the need for a second end cap.

As best shown in FIG. 3, the end cap 24 has a cylindrically shaped inner region 30 that substantially corresponds to the shape of the inner diameter of the hollow central region 20. The end cap 24 also has a shoulder region 32 that substantially abuts the end 16 of the tube 12 when the end cap 24 is sealingly engaged to the tube 12. The end cap 24 also has a cylindrically shaped outer region 31 that substantially matches the outer shape of the exterior 14 of the tube 12 such that the outer surface is substantially smooth when the parts are coupled together.

To seal the tube 12 to the end cap 24, a solid-state weld 40 is introduced between the shoulder region 32 and the end 16 that is mechanically sound and prevents leakage of fluid between the end cap 24 and tube 12 from the hollow central region 20 to the environment. The solid-state weld 40 is preferably formed having a circular weld pattern, as opposed to a linear weld pattern. Further, due to the potentially volatile or flammable nature of the fluid contained within the hollow central region 20, the solid-state weld 40 must be formed without significant heat buildup.

A device capable of producing torsional (i.e., rotational or circular) vibration pattern is required to achieve the desired circular weld pattern, without the associated heat buildup, is described below in FIG. 4.

To achieve torsional vibration action, as shown in FIG. 4, an ultrasonic welding device 48 is disclosed in which the linear vibrational action of two (or four) ultrasonic transducers 50 are coupled together to an ultrasonic horn 52, or sonotrode. The transducers 50 are moved in a linear pattern inward and outward, as shown by arrows 53, to produce a torsional vibration pattern in an ultrasonic horn 52, shown by arrow 55. The horn 52 is pressed against a circular closure plate 54 that is sized to substantially match the shape of the end 16 and shoulder region 32. Thus, the circular closure plate 54 has a torsional vibration pattern of similar amplitude and frequency to that of the horn 52.

The tube 12 is coupled within a hollow region 61 of a one- or two-piece anvil 63. The cylindrical shaped inner region 30 is introduced within the hollow central region of the tube and the shoulder region 32 is abutted to the end 16. The ultrasonic welding device 48 is moved downward onto the back 25 of the end tube at a desired static force such that the circular closure plate 54 abuts the back 25 of the end tube directly opposite the shoulder region 32 along the cylindrical outer shaped region 31. The ultrasonic welding device 48 is then electrically activated to produce the linear vibration pattern in the transducers 50, which produce the torsional vibration pattern on the horn 52 and closure plate 54. The vibration pattern is translated through the cylindrical shaped outer region 31 to the shoulder region 32, and therein creates frictional action between the shoulder region 32 and the end 16 of the tube 12.

The frictional action between the shoulder region 32 and the end 16 breaks the oxide skin of the end 16 and shoulder region 32 as the end cap 24 and tube 12 are pressed together simultaneously. The end 16 and shoulder region 32 are brought into such close contact that the atomic bonding forces are able to take effect, therein creating the circular solid-state weld 40. Further, the ultrasonic welding process is done without heat buildup, thus the melting temperature of the aluminum is not reached. As such, there are minimal microstructural changes to the tube 12 or end cap 24 associated with the ultrasonic welding process. Further, the lack of heat buildup prevents the fluid contained in the hollow central region 20 from combusting or becoming flammable.

The key process parameters for forming the solid-state weld 40 utilizing an ultrasonic welding device 48 include the vibrational displacement of the welding horn 52, the static force applied to the shoulder region 32 and end 16 by the horn 52 and closure plate 54, the weld energy, weld time, and the peak power of the welding device. For an end cap 24 having a 0.050 inch rim thickness, typical weld process parameters include a weld energy of about 400-550 Joules, a piston pressure of about 1.8 bar (18,355 kilograms/meter$^2$, or 26.1 psi), a peak power of about 260-280 Watts, a weld time of about 238-299 milliseconds, and an displacement of about 0.12-0.18 nanometers.

One preferred torsional ultrasonic welding system used for this work is a Telsonic Model TSP9000, a 20-kHz torsional welder having a 10-kW power capability. Note that the Telsonic welder described above provides a fixed vibrational amplitude at the outer edge of the vibrational horn, so this parameter is not a variable within the system.

To test the welds 40 formed as described above, three separate tests were performed and summarized with respect to separate weld energies and peak powers. The results are illustrated in Table 1.

| Test No. | Weld Energy (J) | Peak Power (W) | Leak ($\times 10^{-10}$ atm-cc/s) | Mechanical (lb) |
| --- | --- | --- | --- | --- |
| 27 | 400 | 2700 | (Between) 1-2 | 1246 |
| 31 | 400 | 2600 | 1-2 | 1037 |
| 34 | 550 | 2800 | 1-2 | 1204 |
| 38 | 550 | 2700 | 1-2 | 1220 |
| 51 | 400 | 2800 | 3-5 | 1025 |

First, a helium leak test was performed using a VEECO MS-40 helium leak detector. A standard of less than about 5.times.10.sup.7 atm-cc/s was adopted as an interim level of leaktight. The standard is among those commonly used in the electronic packaging industry in specifying hermicity. As shown above, all samples tested met or exceeded the leaktight standard.

Second, a test was devised for testing the mechanical strength of the weld. In this test, as shown in FIG. 5, a hole 70 was drilled in the end cap 24 to accommodate a load rod 72. The base of the tube 12 was clamped into a test machine 74. In order to prevent collapse of the tube 12 under clamp force, a steel mandrel 76 was inserted into tube 12. The load rod 72 and end cap 24 was then pulled axially (as shown by arrow 77) along the length of the tube 12 until such time as the weld 40 failed, causing the end cap 24 to separate from the tube 12 at the shoulder. As shown in Table 1, mechanical forces of at least 1000 pounds were necessary to separate the end cap 24 form the tube 12 along the weld 40, well within acceptable strength standards desired to withstand expected G-forces during operation.

Figure 6:
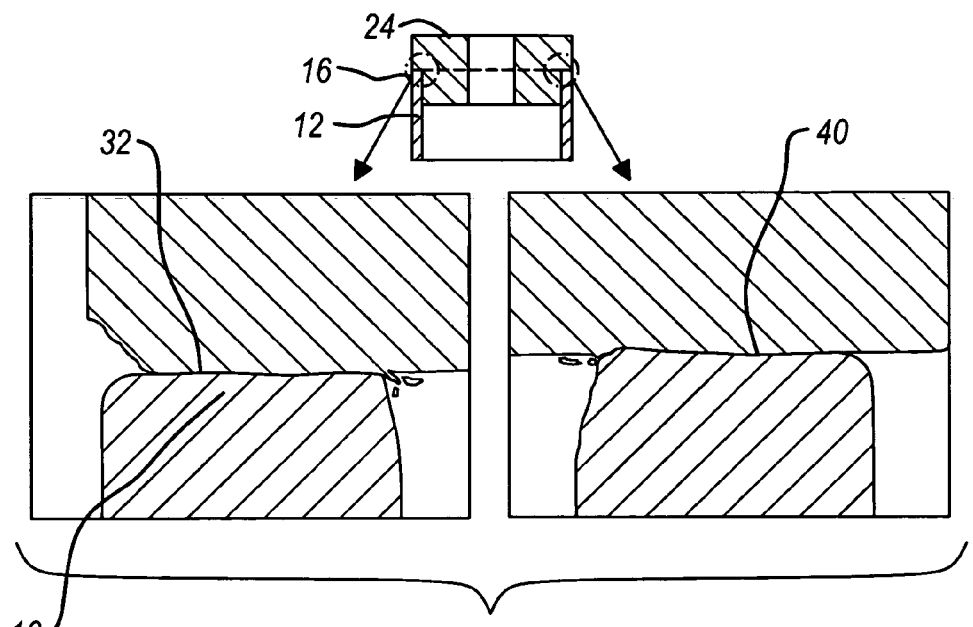
FIG. 6 is a section view of a portion of the tube and end cap of FIG. 1 illustrating the degree of bonding of the weld.

Third, a metallurgical examination was made of the weld 40. In this test, a section was taken through the end caps to examine the degree of bonding. As shown in FIG. 6, the weld 40 extended substantially along the shoulder 32 and end 16 of the tube 12.

In addition, in alternative embodiments, as further shown in FIGS. 1 and 2, it is also highly desirable to affix the one or more fins 22 to the exterior 14 of the tube 12 using a similar ultrasonic weld process, in which a weld 42 is coupled between the end 44 of the respective fin 22 and the exterior 14 of the tube 12. Two preferred embodiments have been developed.

Figure 7A:
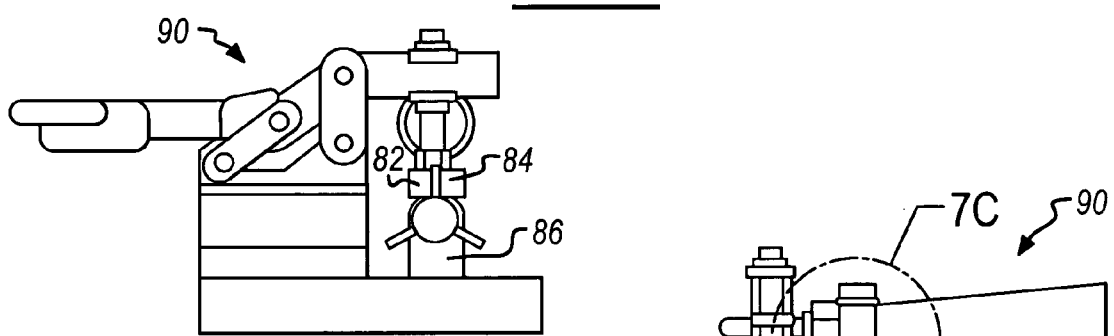
FIGS. 7A-C are perspective views of the process for forming a butt-type ultrasonic weld of the fins to the tube of FIG. 1.
Figure 7B:
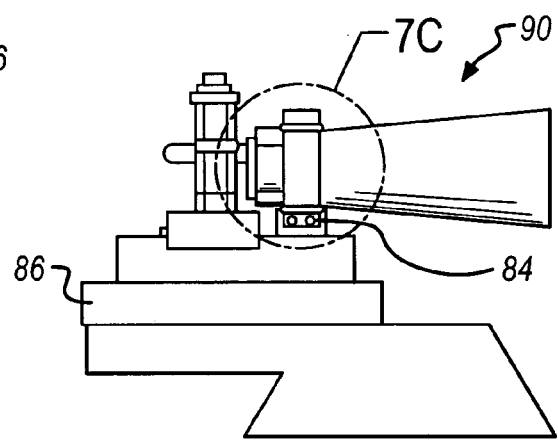
Figure 7C:
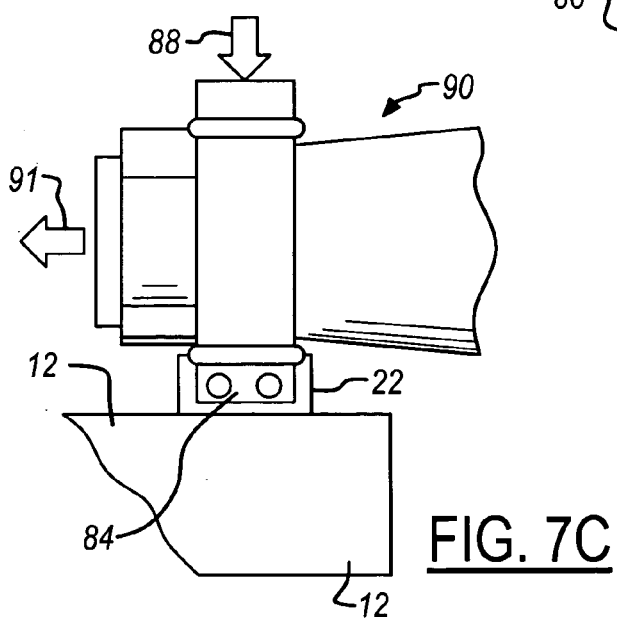

In a first preferred embodiment, as shown better in FIG. 7, a flanged lap joint configuration for attaching the fin 22 to the exterior 14 is described. In another preferred embodiment, as shown in FIG. 8, a flanged lap joint configuration for attaching the fin 22 to the exterior 14 is described.

Referring now to FIG. 7, the tube 12 is firmly clamped in place between a pair of anvil pieces 82, 84. A steel mandrel 86 supports the tube 12 against the downward forces applied to it during the welding process. The fin 22 is clamped to a weld tool 90, here a lateral drive welder (welding transducer), using set screws or other attachment devices.

To form the weld 42, the weld tool 90 and fin 22 are pressed against the tube 12 with a static force (shown by arrow 88). The weld tool 90 is activated to produce linear ultrasonic vibrations (shown by arrows 91) with a weld tip to a desired amplitude, therein causing the fin 22 to exert sufficient frictional force (energy) on the exterior 14 of the tube 12 to form the weld 42. At the conclusion of the weld cycle, the fin 22 is released from the tool 90 and the tool 90 is retracted. The fin seam weld process permits a simple and symmetrical fin shape to be maintained.

Referring now to FIG. 8, the basis for forming the flanged lap joint involves first placing a 90 degree bend in the fin 22, therein forming an abutting surface 91, or faying surface, and an extending surface 93. The abutting surface 93 is coupled along its entire length to the exterior surface 14 and the weld tool 90 is brought down upon the fin 22 prior to activation. The extending surface 93 extends perpendicularly away from the exterior surface 14 in this arrangement. The weld tool 90 is then activated to produce ultrasonic vibrations, therein forming a weld 42 at the interface between the abutting surface 93 and the exterior surface 14 of the tube 12. Under this arrangement, it is not necessary to clamp the fin 22 to the weld tool 90.

In the preferred embodiments of FIGS. 7 and 8, for a 5 inch long tube having 0.437 inch outer diameter and a 1 inch long fin, a pressure/force of about 50 psi (corresponding to about 350 pounds) and an amplitude of 50 micrometers results for the weld tool 90 in a energy output of about 250-300 Joules. Under either approach, polished metallurgical cross sections were performed and the resultant bonds were significant and acceptable for the desired end use applications.

The present invention solves the problem of prior art aluminum tubular fluid storage units by designing an aluminum cap that can be ultrasonically welded to the ends of the aluminum tube. The formed aluminum tubular unit allows one or both ends of the cylindrical tube to be sealed to prevent leakage and further provides a tube that will be leak free for multi-year storage. The ultrasonic welding of the cap to the tube eliminates the use of seals and pins to seal the cap to the tube and further eliminates the need for having a hole in the cap to mechanically couple the respective end cap to the cylindrical tube. Furthermore, since ultrasonic welding does not generate significant heat, highly volatile and flammable fluids can be present when the caps are ultrasonically welded to the cylindrical body.

In addition, the present invention also discloses the parameters necessary for achieving the desired welding and further provides novel characteristics in terms of designing the ultrasonic welding sonotrode and in designing the weld fixtures.

Finally, the present invention discloses a method for attaching one or more fins to the exterior of the tubular unit in an easy and efficient manner with the desired mechanical strength and without significant heat buildup.

While the invention has been described in terms of preferred embodiments, it will be understood, of course, that the invention is not limited thereto since modifications may be made by those skilled in the art, particularly in light of the foregoing teachings.

What is claimed is:

1. A method for forming a substantially leak-tight aluminum tubular unit used for long-term storage of fluids, the method comprising:
   providing a hollow cylindrical tubular unit having a cylindrically shaped exterior, an end, and a hollow central region;
   providing an end cap having a cylindrically shaped inner region, a shoulder region, and a cylindrically shaped outer region, said cylindrically shaped outer region shaped substantially similar to said cylindrically shaped exterior of the hollow cylindrical tubular unit;
   introducing a cylindrically shaped inner region of the end cap within said hollow central region such that a shoulder region of the end cap abuts said end;
   introducing a quantity of a fluid into the hollow region of said tubular unit prior to sealingly coupling said end cap to said tube;
   ultrasonically forming a cylindrically shaped solid state weld directly between said end and said shoulder region to sealingly couple the end cap to the hollow cylindrical tubular unit;
   providing at least one fin; and
   ultrasonically welding said one of said at least one fin directly to said cylindrically shaped exterior, whereby as the ultrasonic welding does not generate significant heat highly volatile and flammable liquids can be present and as no significant heat buildup occurs, the melting temperature of the aluminum is not reached so that substantially no microstructural changes to the end cap, the tubular unit, the cylindrically shaped exterior and said fin occur.

2. The method of claim 1, wherein ultrasonically forming a cylindrically shaped weld comprises:
   providing an ultrasonic welding device capable of a torsional vibrational pattern;
   coupling said end cap and said hollow cylindrical tubular unit to said ultrasonic welding device;
   applying a desired static force from said ultrasonic welding device between said end and said shoulder region;
   introducing a torsional vibration pattern at a desired amplitude for a predetermined time from said ultrasonic welding device to said end and said shoulder region, said desired amplitude and said predetermined time being sufficient to create a circular solid-state weld across and directly between said end and said shoulder region whereby as the ultrasonic welding does not generate significant heat, highly volatile and flammable fluids can be present and as no significant heat buildup occurs, the melting temperature of the aluminum is not reached so that substantially no microstructural changes to said end and said shoulder region occur.

3. The method of claim 2, wherein providing an ultrasonic welder having a capable of a torsional vibration pattern comprises:
   providing at least two ultrasonic transducers capable of producing a linear vibrational pattern;
   coupling said at least two ultrasonic transducers to a horn, wherein said linear vibrational pattern is translated to a torsional vibrational pattern within said horn; and
   coupling a circular shaped closure plate to said horn, said circular shaped closure plate substantially matching the shape of said shoulder region and said end.

4. The method of claim 3, wherein coupling said end cap and said hollow cylindrical tubular unit to said ultrasonic welding device comprises:
   providing an anvil having a hollow region;
   introducing said tubular unit within said hollow region;
   introducing the cylindrically shaped inner region of the end cap within said hollow central region such that the shoulder region of the end cap abuts said end; and
   coupling said circular shaped closure plate to a back of said end cap at a desired static force such that said shoulder region substantially contacts said end, wherein said circular shaped closure plate is located directly opposite said shoulder region on said cylindrical outer shaped region.

5. The method of claim 1, further comprising introducing a fluid within said hollow central region prior to sealingly coupling said end cap to said tube.

6. The method of claim 2 further comprising:
   determining a rim thickness of said shoulder region; and determining said desired amplitude, said predetermined amount of time and said static pressure sufficient to create said circular weld pattern as a function of said rim thickness.

7. The method of claim 6, wherein said circular solid-state weld has a mechanical strength of at least one thousand pounds, said mechanical strength defined as the amount of force necessary to separate said end cap from said end.

8. The method of claim 1, wherein said circular solid-state weld forms the substantially leak-tight seal meeting a standard of less than about $5\times10^7$ atm-cc/s helium leakage.

9. The method of claim 1, wherein ultrasonically seam-welding said one of said at least one fin to said cylindrically shaped exterior comprises ultrasonically seam-welding a faying surface of said one of said at least one fin directly to said cylindrically shaped exterior.

10. The method of claim 9, wherein ultrasonically seam-welding said one of said at least one fin to said cylindrically shaped exterior comprises:

introducing a steel mandrel within said hollow central region;

clamping said hollow cylindrical tubular unit within a pair of anvils;

clamping one of said at least one fin in a lateral drive welder;

pressing said one of said at least one fin against a cylindrically shaped exterior at a desired force;

activating said lateral device welder at a desired amplitude to produce a linear vibrational pattern, wherein said linear vibrational pattern and said static force are sufficient to form an ultrasonic seam-weld directly between said fin and said cylindrically shaped exterior.

11. The method of claim 1 wherein ultrasonically welding said at least one fin directly to said cylindrically shaped exterior comprises ultrasonically seam welding said one of said at least one fin to said cylindrically shaped exterior.

12. The method of claim 11, wherein ultrasonically seam welding said one of said at least one fin to said cylindrically shaped exterior comprises:

bending one of said at least one fin at a 90 degree angle to form an abutting surface and an extending surface;

coupling said abutting surface along the length of said cylindrically shaped exterior;

coupling an ultrasonic welding device onto said abutting surface at a first force; and activating said ultrasonic welding device to produce a linear vibrational pattern of a first amplitude, wherein said first force and said first amplitude are sufficient to form an ultrasonic seam weld between said abutting surface and said cylindrically shaped exterior.

* * * * *